United States Patent [19]

Chow

[11] 4,449,157

[45] May 15, 1984

[54] SURGE PROTECTION FOR SIGNAL TRANSMISSION SYSTEMS

[75] Inventor: Peter E. K. Chow, Nepean, Canada

[73] Assignee: Northern Telecom Limited, Montreal, Canada

[21] Appl. No.: 423,609

[22] Filed: Sep. 27, 1982

[51] Int. Cl.³ .................. H02H 9/04; H02H 3/20; H02H 7/20

[52] U.S. Cl. .................. 361/56; 361/91; 361/119; 361/111; 179/170 R; 330/207 P

[58] Field of Search .................. 361/56, 90, 91, 119, 361/118, 117, 111, 112, 54, 55; 179/170 R, 170 J, 170 T; 330/207 P

[56] References Cited

U.S. PATENT DOCUMENTS

| | | | |
|---|---|---|---|
| 3,633,093 | 1/1972 | Templeton, Jr. et al. | 361/56 X |
| 4,066,918 | 1/1978 | Heuner et al. | 361/56 X |
| 4,110,570 | 8/1978 | Foster | 361/119 |
| 4,161,008 | 7/1979 | Zimmermann et al. | 361/119 X |
| 4,389,695 | 6/1983 | Carpenter, Jr. | 361/91 X |

Primary Examiner—Patrick R. Salce
Attorney, Agent, or Firm—Sidney T. Jelly

[57] ABSTRACT

Secondary surge protection means for equipment connected to transmission lines, for example line-powered amplifiers interconnecting T1 or T1C telephone lines, includes two diode bridges and a pair of surge diverters. One diode bridge has its cathode/anode nodes connected one to each conductor of an incoming transmission line. The other diode bridge is connected in like manner to an outgoing transmission line. Each surge diverter interconnects the anode/anode node of one bridge and the cathode/cathode node of the other bridge. When a surge on one line causes the voltage across one or other diverter to exceed a predetermined threshold, the diverter conducts, shunting the surge past the amplifier to dissipate in the other line. The two transmission lines may be coupled to the input and output, respectively, of one amplifier, or to the input of one amplifier and the output of a different, oppositely connected amplifier. In both cases, power for the or each amplifier may be derived from the two lines, for example by a Zener diode interconnecting them in known manner. The characteristics of each surge diverter are such that it will respond to fast rise-time lightning pulses yet tolerate long duration power surges, and will be operated by differential mode or common mode surges.

7 Claims, 3 Drawing Figures

SURGE PROTECTION FOR SIGNAL TRANSMISSION SYSTEMS

This invention relates to surge protection for signal transmission systems having a plurality of transmission lines and is particularly applicable to protecting line-powered repeater amplifiers interconnecting telephone lines against damage by hazardous surges on the lines.

Surges are produced in telephone or other signal transmission lines in various ways. Short duration surges may be produced by lightning discharges in the vicinity of, or directly onto, the transmission line. Longer duration surges may be produced by a neighbouring power transmission line experiencing fault or unbalanced-loading conditions. Line repeater amplifiers interconnecting multi-paired telephone cables in rural areas are particularly vulnerable because such cables are often carried by the same poles that carry power conductors and are also more exposed to lightning.

The surges propagate along the telephone or other signal line and impinge upon the line repeater amplifiers or other equipment terminating the line. The destructive effect of the surge is dependent upon both its amplitude and duration, neither of which is predictable. It is usual therefore to design the terminating equipment to withstand surges of a specified level and duration and to provide surge diverters to prevent higher voltages reaching the equipment. These surge diverters characteristically have a very high impedance until a certain threshold voltage is impressed across them, whereupon they switch or "fire" providing a low impedance path around the equipment to be protected.

Two types of surge diverter commonly used are carbon block and gas discharge tubes. Both have a gap which breaks down and conducts when the threshold voltage is reached. Unfortunately, both tend to deteriorate over a long period of time. The carbon block type becomes contaminated by repeated operation and the gas tubes tend to leak. Thus neither device is entirely satisfactory, especially for remote or relatively inaccessible locations, such as where line repeater amplifiers are situated.

It is common practice therefore to treat such surge diverters as a primary protection and also to provide secondary protection to dissipate the surge energy which reaches the equipment to be protected. Such secondary protection often is provided at the equipment, for example on the line repeater card, and comprises resistors and a solid-state device which will operate many times over a long period without deterioration. One known scheme using solid-state devices has a diode bridge with its cathode/anode nodes connected one to each of the line terminals of the equipment to be protected. A series resistor is connected between each such terminal and the associated line conductor. A Transzorb (Trade Mark), a transient voltage suppressor characterised by high surge handling capacity and very fast response time, interconnects the other nodes of the bridge. The anode of the Transzorb is connected to the anode/anode node of the bridge. When a differential-mode surge raises the voltage between the line terminals to a predetermined level, the Transzorb "fires", providing a low impedance shunt path via the Transzorb and two opposite arms of the bridge. The series resistors limit the current through the shunt path to a safe level for the components.

One disadvantage of such a known scheme is that the Transzorb will not "fire" if a common mode surge raises the voltage of both conductors of a line simultaneously relative to a common bus. Then relatively low voltage, high current surges, for example induced common-mode 60 Hz power surges, may overload the series resistors and transformer and/or power extraction device without the threshold voltage being developed across the Transzorb to "fire" it. Also the Transzorb is primarily intended to respond to high amplitude, short duration surges, and it will be appreciated that to upgrade the system would require bulkier components to be accommodated on an already congested repeater card.

An object of the present invention is to overcome these disadvantages.

According to the present invention, a signal transmission system having a plurality of transmission lines, each line comprising a pair of conductors, includes surge protection means comprising a first diode bridge with its cathode/anode nodes connected to respective conductors of one line, a second diode bridge with its cathode/anode nodes connected to respective conductors of a second line, and a pair of surge diverter devices each connected between the anode/anode node of one diode bridge and the cathode/cathode node of the other diode bridge. Each surge diverter device comprises a device which switches from a high impedance state to a low impedance state when a predetermined threshold voltage is impressed across it.

In one embodiment of the invention, the two lines interconnected by the protection circuitry are coupled in series by a signal amplifier.

In another embodiment of the invention, the two lines interconnected by the protection circuitry are coupled to two different amplifiers connected in opposite directions. Said one line is connected to the input of one amplifier, said second line is connected to the output of the other amplifier.

In both embodiments, power for the or each amplifier may be supplied via the lines. Power extraction means then conveniently comprises a Zener diode interconnecting the same lines that are coupled by a surge diverter.

Exemplary embodiments of the invention will now be described with reference to the accompanying drawings, in which.

Figure 1:
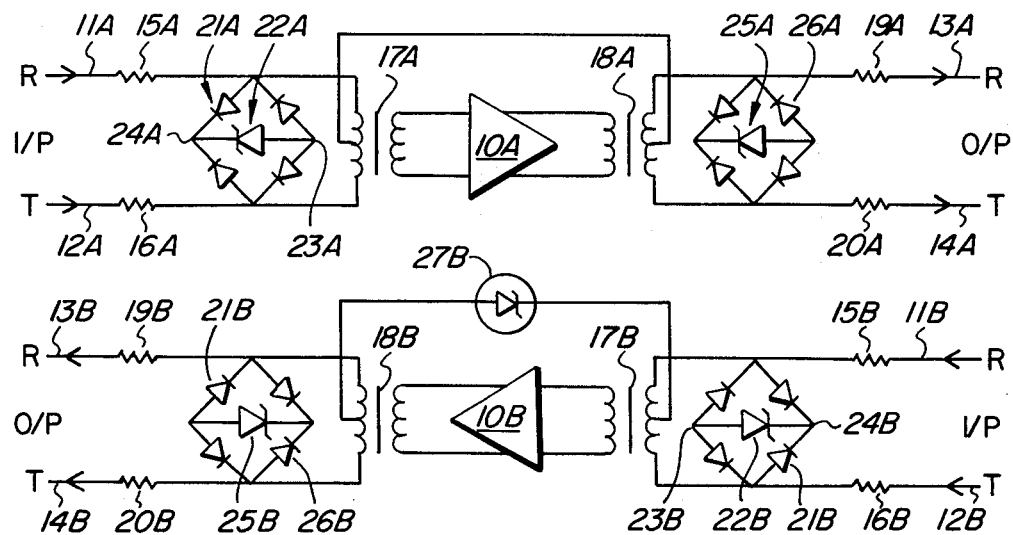
FIG. 1 is a schematic circuit diagram of a pair of intermediate repeater amplifiers in a signal transmission system utilizing known surge protection means.

In the drawings, each Figure shows two repeater amplifiers connected to convey signals in opposite directions. Each amplifier is connected in series between two transmission lines. In a telephone system each such line will usually comprise two conductors, designated "tip" (T) and "ring" (R), of a shielded multipaired cable. In a typical system the two repeater amplifiers, together with many similarly connected pairs of amplifiers, would be located at a line repeater station. Several such stations might be provided at discrete locations along the multipaired cable. It should be understood that, although not shown, primary protection in the form of a pair of gas tubes or the like would be provided between each line conductor and a common bus.

Where components in the three Figures are identical and/or serve a similar function they have been given the same reference numeral. Where some components are identical, but associated with different transmission directions, they have been given the same reference numeral, but with an additional letter A or B to indicate with which transmission direction they are associated. Where it is not necessary to distinguish, the additional character A or B will be omitted in the description.

Referring now to FIG. 1, a repeater amplifier 10A interconnects the conductors 11A, 12A of an incoming transmission line with the conductors 13A, 14A of an outgoing line. The conductors 11A and 12A are connected via series resistors 15A and 16A, respectively, to opposite ends of a centre tapped primary winding of a transformer 17A. The secondary winding of the transformer is coupled to the input of the repeater amplifier 10A. A similar transformer 18A is connected to the output of the repeater amplifier 10A and has its centre tapped winding connected via series resistors 19A and 20A, respectively, to the conductors 13A and 14A of the outgoing line. The centre taps of the transformers 17A and 18A are connected directly together in well known manner to provide d.c. coupling between the two lines.

A diode bridge 21A is connected with its cathode/anode nodes one to each end of the centre-tapped winding of input transformer 17A. A Transzorb 22A has its anode connected to the anode/anode node 23A of the bridge 21A and its cathode connected to the cathode/cathode node 24A of the bridge. A second Transzorb 25A and diode bridge 26A are connected in similar fashion across the centre-tapped winding of the output transformer 18A.

The second repeater amplifier 10B is arranged to convey signals oppositely to the first repeater amplifier 10A but otherwise is connected to the line conductors 13B, 14B and 11B, 12B by a similar set of series resistors 15B, 16B and 19B, 20B, and input and output transformers 17B and 18B, respectively, and is protected by Transzorbs 22B and 25B connected across diode bridges 22B and 26B, respectively.

However, the centre taps of transformers 17B and 18B are not directly interconnected but instead are interconnected by a power-extraction Zener diode 27B which supplies power to both repeater amplifiers 10A and 10B. The power is derived from a constant current source fed serially to each line from a main source (not shown) in a well known manner. Usually, one line will be connected to a 130 volt positive source and the other to a 130 volt negative source.

In normal operation the Transzorbs 22A, 25A, 22B and 25B are non-conducting and present a relatively high impedance across the corresponding line. When an excessive voltage surge occurs on one line conductor, for example 11A, and the threshold voltage of the corresponding Transzorb 22A is exceeded, the Transzorb 22A conducts, providing with the diodes in opposite arms of the bridge 21A a relatively low impedance shunt path across the transformer 17A. The resistors 15A and 16A limit the current in this shunt path to a safe value.

It has been found that this arrangement is not entirely satisfactory because the Transzorb will not "fire" if both line conductors rise in potential simultaneously even though such a condition can arise in practice and destroy the amplifier. Also, the arrangement relies upon the series resistors, transformer windings and, where interposed, power extraction Zener diode to handle low voltage, high current surges which would not "fire" the Transzorb. Failures have occurred, due apparently to overheating of the series resistors by unexpectedly long duration, high current surges. This has led to more stringent withstand requirements. In particular, instead of withstanding three 183 mS surges of 5 amperes r.m.s. at 60 Hz, applied at 1 second intervals, each conductor must withstand a current of 5 amperes r.m.s. at 60 Hz for 1 second.

To upgrade this known design, the resistors, transformer and Zener diode would have to be replaced by bulkier equivalents. This is not considered practical because limited space is available on the amplifier printed circuit boards and it is undesirable to replace line repeater cases already installed.

Embodiments of the invention overcome these problems. The embodiment shown in FIG. 2 differs from the prior art circuit of FIG. 1 in that the diode bridges 21 and 26 are connected directly across the corresponding line conductors 11, 12 and 13, 14, respectively. Also the pairs of series resistors 15, 16 and 19, 20, are each connected in series between the corresponding bridge node and the centre-tapped transformer winding. There is no significance to the power extraction Zener diode 27A being associated with amplifier 10A rather than amplifier 10B.

Significantly, instead of a Transzorb connected across the nodes of each bridge, a pair of oppositely-poled surge diverters 30, 31 connect each input bridge 21 to the corresponding output bridge 26, bypassing the amplifier 10. Thus each diverter 30 has its anode connected to the anode/anode node 23 of input bridge 21 and its cathode connected to the cathode/cathode node 32 of output bridge 26. Each second diverter, 31, has its anode connected to the anode/anode node 33 of output bridge 26 and its cathode connected to the cathode/cathode node 24 of input bridge 21.

A high voltage (lightning) surge on any one or pair of conductors of one line will cause one or other of the surge diverters to "fire", shunting the surge past the amplifier to the other line.

When a longer duration power surge occurs, the voltage developed across the series resistors, transformer winding resistance and, (where applicable), power extraction diode dynamic impedance increases to a predetermined level, whereupon the appropriate diverter "fires", preventing further voltage increase and shunting the excess surge energy past the amplifier to dissipate in the other transmission line. When the current surge reverses, the first diverter "extinguishes" and the second, oppositely-poled diverter "fires" to maintain a shunt path around the amplifier.

Figure 2:
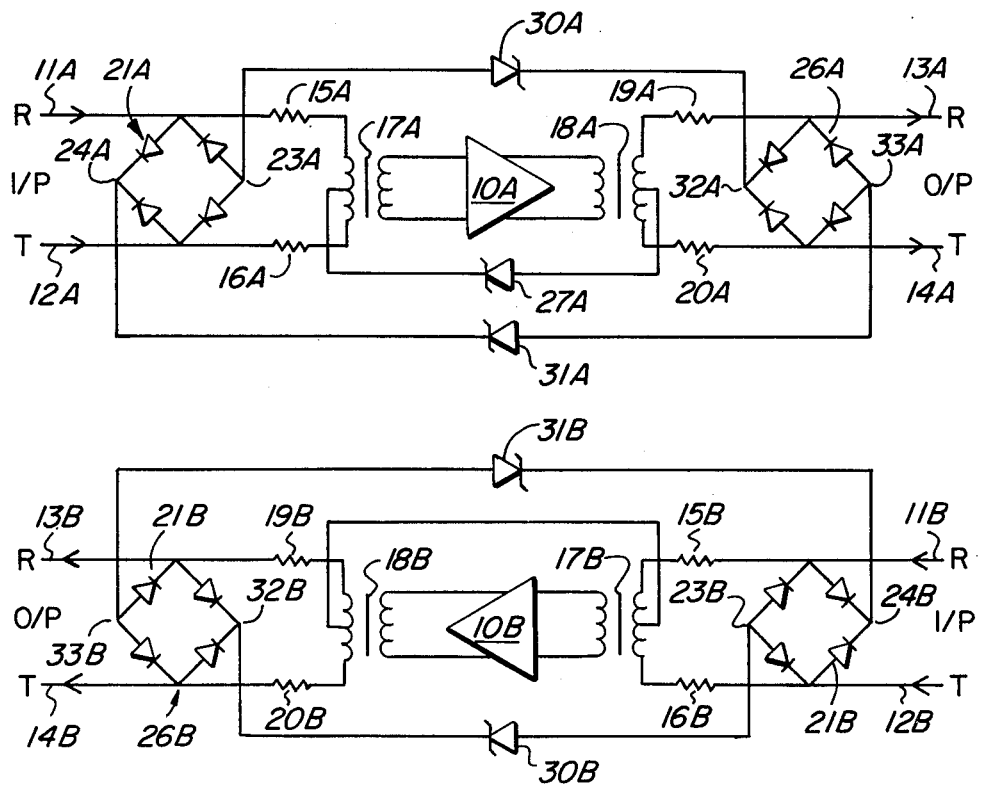
FIG. 2 is a schematic circuit diagram of a pair of intermediate repeater amplifiers in a signal transmission system utilizing surge protection means in accordance with one embodiment of the present invention.
Figure 3:
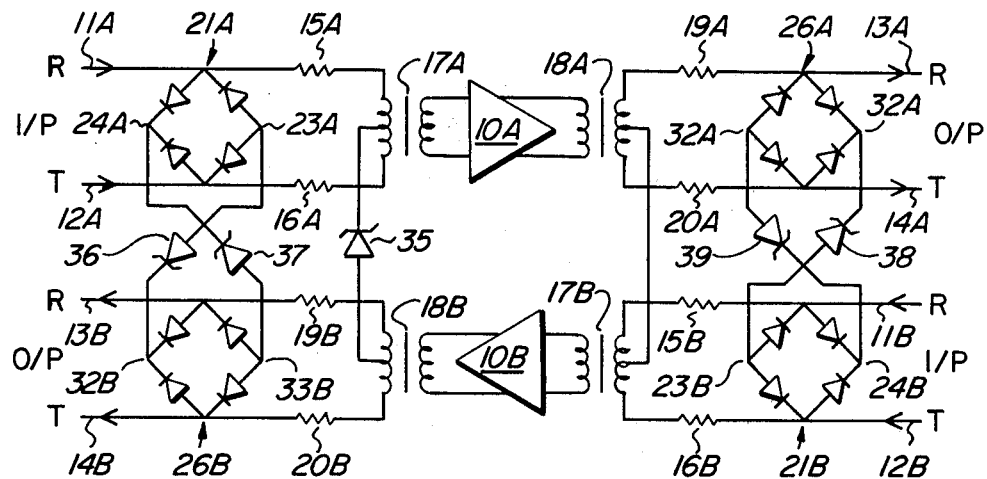
FIG. 3 is a schematic circuit diagram of a pair of looped repeater amplifiers utilizing surge protection means in accordance with a second embodiment of the invention.

In the circuit shown in FIG. 2 power is fed in known manner from two opposite polarity 130 volt sources, one at each end of the system, towards a central point. The embodiment of FIG. 3 is different, being a so-called "power-looping" repeater amplifier arrangement in which the input transformer of each amplifier is d.c. coupled to the output transformer of the other amplifier. Thus, in FIG. 3, the power extraction diode 35 is connected between the centre taps of input transformer 17A and output transformer 18B, respectively, and the centre taps of transformers 18A and 17B are directly interconnected. The surge diverters follow the power feed. Accordingly one pair of diverters 36 and 37 interconnect the corresponding nodes of diode bridges 21A and 26B, and a second pair of diverters 38, 39 interconnect diode bridges 21B and 26A. The operation of this embodiment is basically the same as that illustrated in FIG. 2, except that the surge is now diverted to a different pair of conductors in the same multi-paired cable. It should perhaps be noted that in such a cable the input pairs usually are segregated from the output pairs by a grounded inner divider or sheath.

In both embodiments it will be observed that once the surge diverters switch the bulk of the surge current is not carried by the series resistors, power extraction Zener diode and transformers so these may be replaced by less expensive, lower power-rated equivalents.

In either embodiment surge diverters other than Transzorbs will be required since they must be capable of handling the longer duration power surges with associated relatively long thermal time constants. Nevertheless, the diverters should still have a fast response so as to respond to short rise-time lightning pulses. It should be noted that the d.c. power supply current will persist after the surge has dissipated. Consequently the surge diverter devices should turn off in the presence of this supply. If necessary, additional control circuitry might be provided to turn the device off.

One device suitable for telephone line repeater protection is presently marketed under the type number LS 5060 by SGS Semiconductor Group and is configured as a triac, having a bidirectional characteristic. The device switches or "fires" when the voltage across it exceeds about 60 volts, substantially independently of the surge rise-time. The voltage across the device in its "on" state is about 2 volts, allowing it to handle relatively long duration surges without excessive dissipation requirements. The device's "holding" current is larger than the d.c. power supply current so that the device will return to its "off" state when the surge disappears.

It is envisaged, however, that a corresponding unidirectional device, effectively a single SCR, will be used since the diode bridges provide polarity steering. It is expected that such a device will "switch" when the voltage across it exceeds about 18 volts, so that, with series resistors of, say, 5.6 ohms, the device will switch when the surge current exceeds about 1 ampere.

It will be appreciated that for high frequency digital applications, such as T1 and T1C carriers, the capacitance across the amplifier must be kept low enough to avoid undesirable feedback. An advantage of embodiments of the invention is that the shunt path always includes the capacitance of two of the bridge diodes in series with that of the surge diverter. Therefore these diodes and the diverter itself may each have a relatively high capacitance and corresponding current-carrying capacity.

Although especially applicable to telephone system, the invention comprehends other systems in which transmission lines, such as coaxial cables, are interconnected by surge-sensitive devices such as amplifiers.

What is claimed is:

1. Surge protection means for a signal transmission system having a plurality of transmission lines each comprising a pair of conductors, said protection means comprising:
   a first diode bridge having two cathode-anode nodes, each to be connected to a respective one of said pair of conductors of one transmission line;
   a second diode bridge having two cathode-anode nodes each to be connected to a respective one of the pair of conductors of a second transmission line and;
   a pair of surge diverter devices, one interconnecting a cathode-cathode node of said first bridge and an anode-anode node of said second bridge, the other device interconnecting an anode-anode node of said first bridge and a cathode-cathode node of said second bridge,
   said surge diverter devices being adapted to switch from a high impedance state to a low impedance state when the voltage across the device exceeds a predetermined level.

2. Surge protection means as claimed in claim 1, wherein said one transmission line and said second transmission line are coupled to input and output terminals, respectively, of one amplifier.

3. Surge protection means as claimed in claim 2, wherein said one amplifier has associated therewith power extraction means for deriving from at least one of said one and second transmission lines power to supply said amplifier.

4. Surge protection means as claimed in claim 2, wherein said one and said second transmission lines are coupled, respectively, to the input of one amplifier and the output of a second amplifier arranged to convey signals oppositely to said one amplifier, a further pair of transmission lines being coupled to, respectively, the output of said one amplifier and the input of said second amplifier.

5. Surge protection means as claimed in claim 4, including power extraction means connected between said one and second lines to derive therefrom power to supply both amplifiers.

6. Surge protection means as claimed in claim 2, including a resistance in series between the cathode-anode node of one of said first diode bridge and said second diode bridge and the terminal of said amplifier to which that node is coupled.

7. A signal transmission system comprising a plurality of transmission lines, each comprising a pair of conductors, and surge protection means as claimed in any one of claims 1 to 6, said first diode bridge having its cathode-anode nodes connected to respective conductors of one of said plurality of transmission lines and said second diode bridge having its cathode-anode nodes connected to respective conductors of a second of said plurality of transmission lines.

* * * * *